(12) United States Patent
Sella et al.

(10) Patent No.: US 11,606,366 B2
(45) Date of Patent: Mar. 14, 2023

(54) USING CRC FOR SENDER AUTHENTICATION IN A SERIAL NETWORK

(71) Applicant: Cisco Technology, Inc., San Jose, CA (US)

(72) Inventors: Yaron Sella, Beit Nekofa (IL); Kevin Holcomb, Apex, NC (US); Raghuram S. Sudhaakar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 16/459,732

(22) Filed: Jul. 2, 2019

(65) Prior Publication Data

US 2021/0006567 A1 Jan. 7, 2021

(51) Int. Cl.
*H04L 29/06* (2006.01)
*H04L 9/40* (2022.01)
*H04L 12/40* (2006.01)
*H03M 13/09* (2006.01)

(52) U.S. Cl.
CPC .......... *H04L 63/126* (2013.01); *H03M 13/09* (2013.01); *H04L 12/40* (2013.01); *H04L 2012/40215* (2013.01)

(58) Field of Classification Search
CPC ....... H04L 63/126; H04L 12/40; H03M 13/09
See application file for complete search history.

(56) References Cited

U.S. PATENT DOCUMENTS

| 9,705,678 | B1 | 7/2017 | Wang |
| 10,243,732 | B1 | 3/2019 | Herzerg et al. |
| 2002/0159598 | A1* | 10/2002 | Rubinstein ............ H04L 9/0869 380/259 |
| 2004/0081193 | A1* | 4/2004 | Forest ................... H03M 13/43 370/458 |
| 2019/0116045 | A1 | 4/2019 | Markham et al. |

FOREIGN PATENT DOCUMENTS

| WO | 2018017566 | 1/2018 |
| WO | 2018214487 | 11/2018 |

OTHER PUBLICATIONS

"Cyclic redundancy check", online: http://en.wikipedia.org/wiki/Cyclic_redundancy_check, dated May 23, 2019, printed Jun. 19, 2019, 7 pages, Wikimedia Foundation, Inc.

(Continued)

*Primary Examiner* — Jeffrey C Pwu
*Assistant Examiner* — Thong P Truong
(74) *Attorney, Agent, or Firm* — Behmke Innovation Group LLC; Kenneth J. Heywood; Jonathon P. Western

(57) ABSTRACT

In one embodiment, a sender node in a serial network identifies a message identifier for a packet to be sent by the sender node. The sender node selects a cyclical redundancy check (CRC) initialization vector associated with the message identifier. The sender node generates a CRC value for the packet, based on the selected initialization vector. The sender node sends the packet via the serial network. The sent packet includes the message identifier and the generated CRC value. In turn, a receiver node that receives the packet uses the generated CRC value to authenticate the sender node.

20 Claims, 7 Drawing Sheets

(56) References Cited

OTHER PUBLICATIONS

"Serial communication", online: https://en.wikipedia.org/wiki/Serial_communication, dated May 2, 2019, printed Jun. 20, 2019, 3 pages, Wikimedia Foundation, Inc.
Corrigan, Steve, "Introduction to the Controller Area Network (CAN)", Application Report, Texas Instruments, revised May 2016, 17 pages.
Dubrova et al.,"Cryptographically Secure CRC for Lightweight Message Authentication", Cryptography and Communications, vol. 10, pp. 383, 2018.

* cited by examiner

USING CRC FOR SENDER AUTHENTICATION IN A SERIAL NETWORK

TECHNICAL FIELD

The present disclosure relates generally to computer networks, and, more particularly, to using a cyclical redundancy check (CRC) for sender authentication in a serial network.

BACKGROUND

Serial networks are ubiquitous in a wide variety of industries, ranging from vehicles to factory automation. In general, a key distinction of serial networks is that packets are sent serially on a bus, as opposed to in parallel. In other words, serial networks operate as a broadcast medium whereby any node on the network can transmit a message and all other nodes on the network can receive. To ensure that a given packet is processed by its intended receiver in a serial network, the sender may include an identifier indicative of its identity. Thus, when a node receives the packet, it may analyze the identifier of the sender, to determine whether the receiving node should process the packet.

Unfortunately, the operation of most serial networks also presents a security concern. Indeed, if a malicious node sends a packet with a spoofed sender identifier, the receiver may inadvertently treat the packet as legitimate. In the vehicle setting, for instance, this can present a safety concern. For example, spoofed sensor data may cause the braking system of a vehicle to engage while driving, thereby creating a potentially hazardous situation. Accordingly, sender authentication in a serial network can enhance both security and safety. However, doing so without modifying the underlying communication protocol remains challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
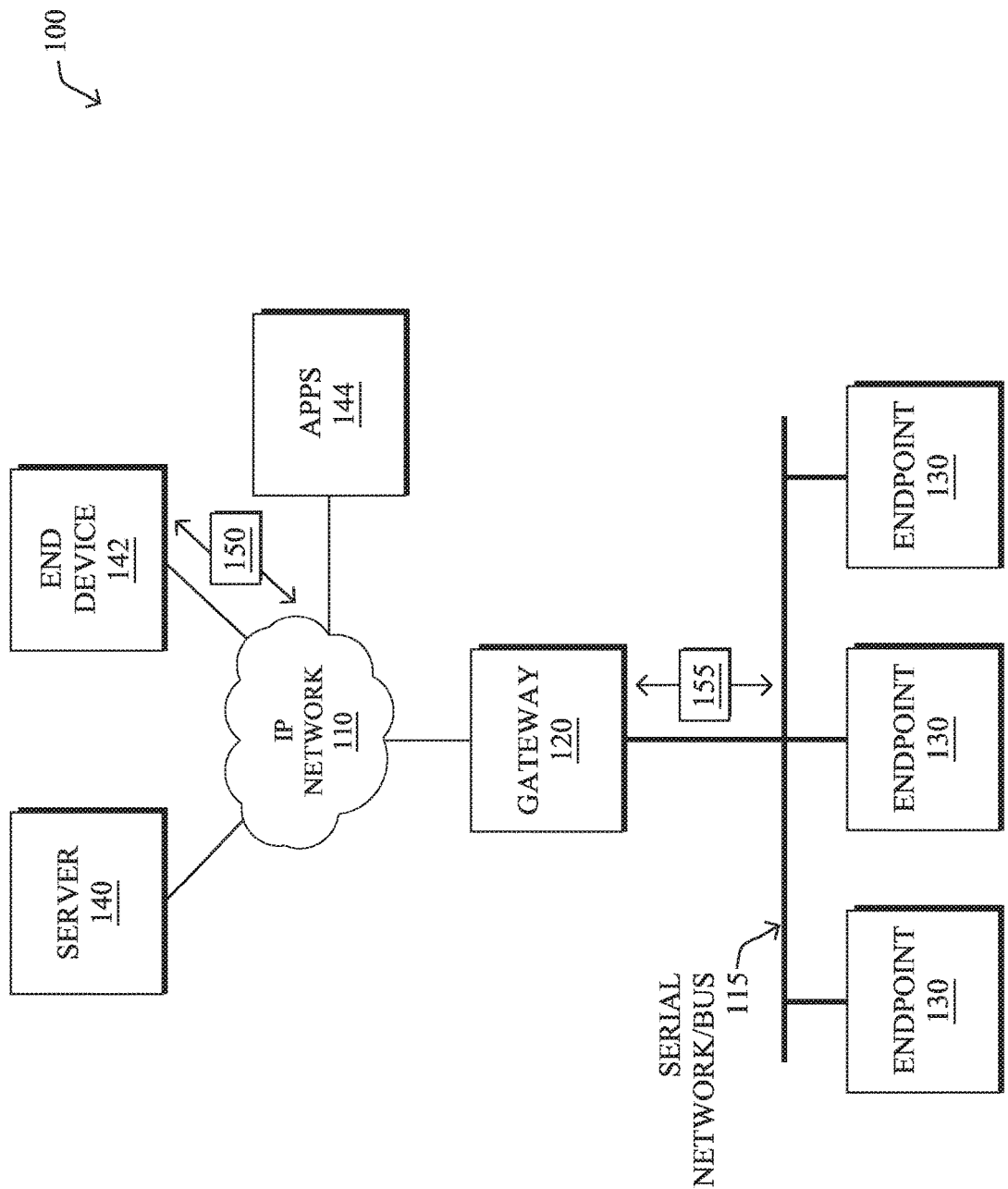
FIGS. 1A-1B illustrate an example communication system.

According to one or more embodiments of the disclosure, a sender node in a serial network identifies a message identifier for a packet to be sent by the sender node. The sender node selects a cyclical redundancy check (CRC) initialization vector associated with the message identifier. The sender node generates a CRC value for the packet, based on the selected initialization vector. The sender node sends the packet via the serial network. The sent packet includes the message identifier and the generated CRC value. In turn, a receiver node that receives the packet uses the generated CRC value to authenticate the sender node.

In further embodiments, a receiver node in a serial network receives a packet from a sender node that includes a message identifier and a cyclical redundancy check (CRC) value. The receiver node selects a CRC initialization vector associated with the message identifier. The receiver node generates a CRC value based on the selected initialization vector. The receiver node authenticates the sender node by comparing the generated CRC value to the CRC value included in the packet.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Networks may also be, or may include, an "Internet of Things" or "IoT" network. Loosely, the term "Internet of Things" or "IoT" may be used by those skilled in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Serial networks are another type of network, different from an IP network, typically forming a localized network in a given environment, such as for automotive or vehicular networks, industrial networks, entertainment system networks, and so on. For example, those skilled in the art will be familiar with the Controller Area Network (CAN) bus (or CANBUS) protocol (a message-based protocol to allow microcontrollers and devices to communicate with each other in applications without a host computer), and the MODBUS protocol (a serial communications protocol for use with programmable logic controllers, such as for remote terminal units (RTUs) in supervisory control and data acquisition (SCADA) systems). Unlike an IP-based network, which uses a shared and open addressing scheme, a serial communication network generally is based on localized and proprietary communication standards, where commands or data are transmitted based on localized device identifiers, such as parameter identifiers (PIDs), localized station addresses, and so on.

FIG. 1A illustrates an example communication system 100 illustratively comprising an Internet Protocol (IP) network 110 and a serial network/bus 115, along with a gateway (or other network device) 120 interconnecting the two networks, as described in greater detail below. Serial network 115, in particular, illustratively comprises one or more endpoints 130 (e.g., a set of one or more controlled devices, sensors, actuators, controllers, processors, and so on), such as part of a vehicular network, an industrial network, etc. The endpoints may be interconnected by various methods of serial communication. For instance, the serial network/bus 115 may allow the endpoints 130 to communicate serial data/packet 155 (e.g., commands, sensor data, etc.) using predefined serial network communication protocols (e.g., OBD, CANBUS, MODBUS, etc.). In this context, a serial network protocol consists of a set of rules defining how the endpoints interact within the serial network 115.

IP network 110, on the other hand, illustratively comprises links interconnecting one or more devices through a network of routers or switches. For example, a set of one or more servers (or controllers) 140, one or more end devices (e.g., user devices, workstations, etc.) 142, and one or more other application devices 144 may be interconnected with the IP network 110. The devices, generally, may be interconnected by various methods of IP-based communication. For instance, the links may be wired links or shared media (e.g., wireless links, PLC links, etc.) where certain devices may be in communication with other devices, e.g., based on distance, signal strength, current operational status, location, etc. IP data packets 150 (e.g., traffic and/or messages sent between the devices/nodes) may be exchanged among the nodes/devices of the IP network 110 using predefined IP network communication protocols such as the transmission control protocol (TCP), TCP/IP, user datagram protocol (UDP), or other protocols where appropriate. In this context, an IP network protocol consists of a set of rules defining how the nodes interact with each other over the IP network 110.

In general, the gateway device 120 illustratively bridges both the IP network 110 and serial network 115, and as such may be considered to be a part of either or each network, accordingly. Further, those skilled in the art will understand that any number of nodes, devices, links, endpoints, etc. may be used in the computer system 100, and that the view shown herein is for simplicity. Also, those skilled in the art will further understand that while the system is shown in a certain orientation, system 100 is merely an example illustration that is not meant to limit the disclosure. As would be appreciated, gateway device 120 may or may not be present for any given implementation of serial network 115.

Figure 1B:
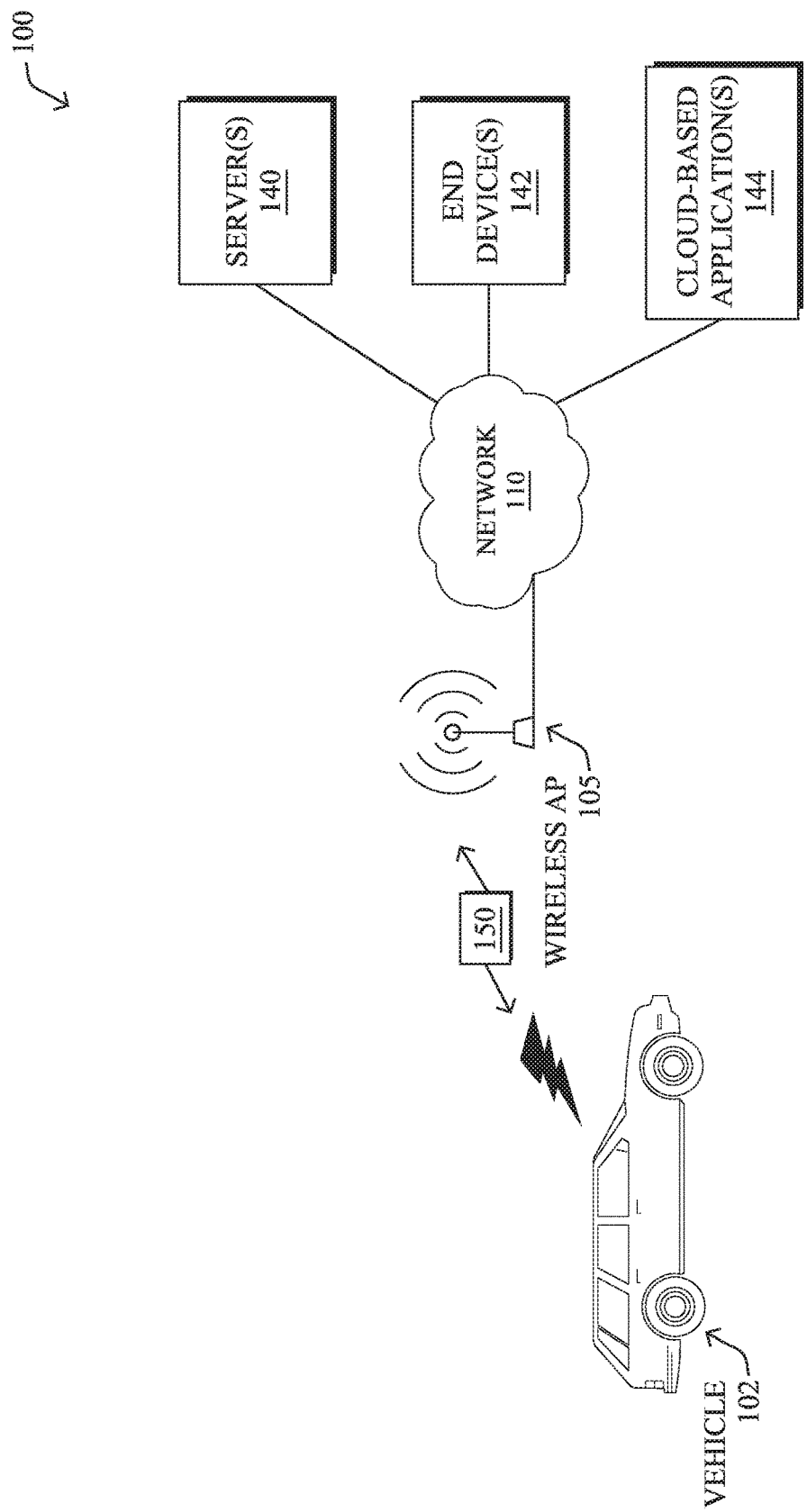

FIG. 1B illustrates one potential implementation of communication system 100, according to various embodiments. As shown, assume that system 100 includes a vehicle 102 in which serial network/bus 115 and gateway 120 are located. For example, many passenger vehicles now include a CAN bus-based serial network that connects any number of endpoint sensors and/or actuators (endpoints 130). To connect the serial network 115 of vehicle 102 to IP network 110, gateway 120 resident on vehicle 102 may communicate remotely with a wireless access point (AP) 105. For example, vehicle 102 may be in remote communication with a cellular transceiver, Wi-Fi hotspot, or the like, to connect vehicle 102 with network 110. In further embodiments, vehicle 102 may instead be in communication with network 110 via a wired connection. For example, vehicle 102 may be connected to network 110 during charging (e.g., in the case an electric or hybrid electric vehicle), storage, repair, or the like.

Figure 2:
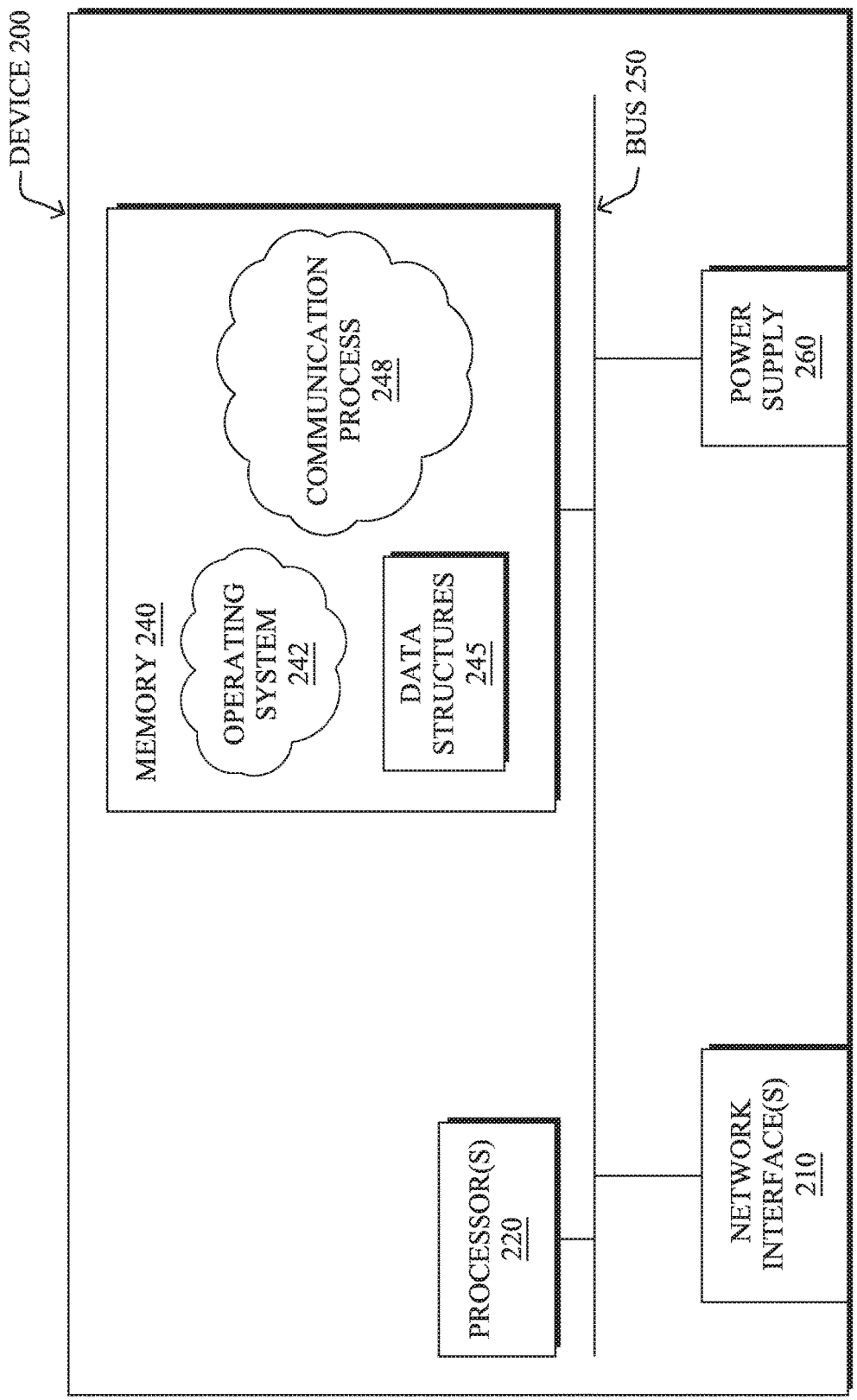
FIG. 2 illustrates an example network device/node.

FIG. 2 is a schematic block diagram of an example node/device 200 that may be used with one or more embodiments described herein, e.g., as any of the nodes/devices shown in FIG. 1 above, particularly as an endpoint 130 within serial network/bus 115, as described herein. In general, node/device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the serial network 115. Notably, one or more of network interface(s) 210 may be configured to transmit and/or receive data using a variety of different serial communication protocols, such as OBD, CANBUS, MODBUS, etc., on any range of serial interfaces such as legacy universal asynchronous receiver/transmitter (UART) serial interfaces and modern serial interfaces like universal serial bus (USB).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein.

Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
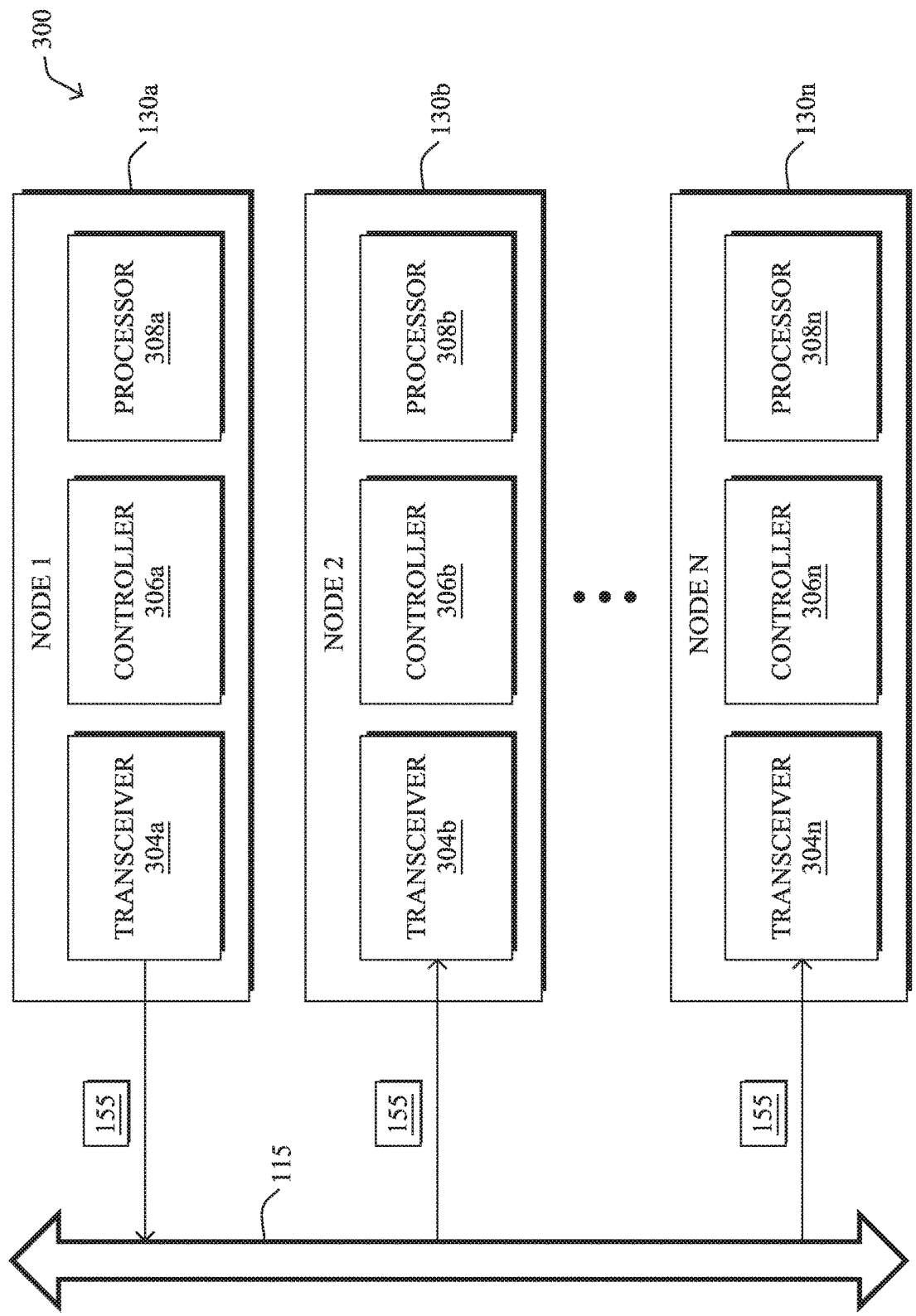
FIG. 3 illustrates an example of the communication of a packet in a serial network.

FIG. 3 illustrates an example 300 of the communication of a packet 155 in serial network 115, according to various embodiments. As shown, there may be any number of nodes 130a-130n (i.e., a first through $N^{th}$ node) in a given system that are interconnected by serial network 115. For example, in the case of a vehicle, nodes 130 may take the form of electronic control units (ECUs), which are responsible for various operations within the vehicle (e.g., the engine, the brakes, the audio system, etc.). For example, a particular node 130 may be responsible for sending collected sensor data, control commands, or the like, to other nodes.

As shown, each node 130 may comprise the following sub-components: a transceiver 304, a controller 306 (e.g., a CAN controller, etc.), and a processor 308. In general, transceiver 304 is configured to transmit and receive packets to and from serial network 115. Controller 306, likewise, is responsible for processing these packets. For example, in the case of a received packet, controller 306 may be responsible for determining whether the receiving node 130 was an intended destination of the packet. If so, controller 306 may forward the packet on to processor 308 for processing. Otherwise, controller 306 may simply drop the packet, as it was intended for another node 130. When the node 130 is to send a packet via serial network 115, controller 306 may be responsible for generating the packet with a payload computed by processor 308.

By way of example, assume that processor 308a of node 130a determines that node 130a should send a packet 155 via serial network 115 to one or more of the other nodes 130. To signify the intended recipient(s), packet 155 may include a message identifier that signifies the type of the message. As is typical in a serial network, each other node 130 in serial network 115, such as nodes 130b and 130n, may receive packet 155. In turn, their respective controllers 306 may assess the message identifier of packet 155, to determine whether the packet is intended for the receiving node 130. For example, controller 306b of node 130b may drop packet 155, based on the message identifier of packet 155. Conversely, controller 306n of node 130n may determine that packet 155 was intended for consumption by node 130n, based on the message identifier of packet 155, and forward packet 155 on to processor 308n for processing.

As noted above, the use of a broadcast media in serial networks means that every node on the network/bus is able to transmit a message that every other node on the network/bus will receive. In turn, the message identifier of the packet (e.g., its MSG-ID) is used to control which of the receiving nodes actually perform further processing of the packet. Unfortunately, this leads to a significant security hole, as a receiving node has no way to verify that the message identifier was used by a legitimate sender of the packet and not spoofed by a malicious sender.

Using CRC for Sender Authentication in a Serial Network

The techniques herein provide for the authentication of a sender of a packet in a serial network using the cyclical redundancy check (CRC) field of the packet. In some aspects, message identifiers may be associated with different CRC initialization vectors, thereby allowing the CRC field of a packet to also be used as a mechanism for authenticating the sender of the packet.

Specifically, according to one or more embodiments of the disclosure as described in detail below, a sender node in a serial network identifies a message identifier for a packet to be sent by the sender node. The sender node selects a CRC initialization vector associated with the message identifier. The sender node generates a CRC value for the packet, based on the selected initialization vector. The sender node sends the packet via the serial network. The sent packet includes the message identifier and the generated CRC value. In turn, a receiver node that receives the packet uses the generated CRC value to authenticate the sender node.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Figure 4:
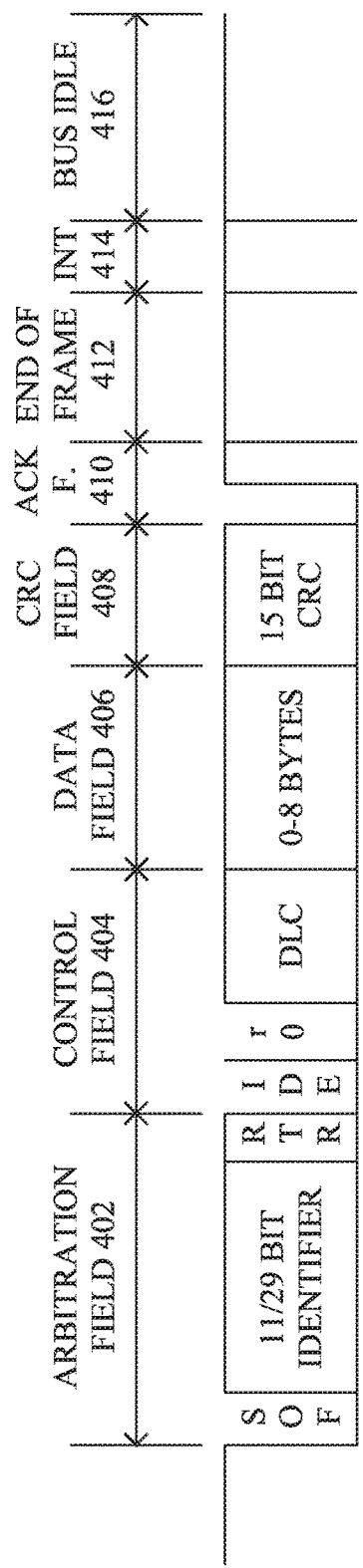
FIG. 4 illustrates an example packet for a serial network.

Operationally, FIG. 4 illustrates an example packet 400 for a serial network, according to various embodiments. More specifically, as shown, packet 400 may be a CAN bus packet that includes any or all of the following fields:

Arbitration Field 402—This field typically includes a 1-bit start of frame (SOF), a message identifier that is usually 11-bits long, but could be extended to 29-bits in rare cases, and a 1-bit remote transmission request (RTR). During operation, arbitration field 402 is used to convey the message identifier for message identification purposes, as well as for arbitration purposes, allowing for more urgent messages to be given preference, in the case of a collision. The RTR may be set, if the sender node requests that the receiver node provide information back to the sender node.

Control Field 404—This field may include a 1-bit identifier extension (IDE) to signify whether any extensions are being transmitted, a reserved bit (r0), and a 4-bit data length code (DLC) that indicates the number of bytes being transmitted.

Data Field 406—This field may include up to 64-bits of payload data being transmitted.

CRC Field 408—This field is typically 16-bits long (15-bits plus a delimiter) that includes a CRC value. Under normal circumstances, the CRC value is computed as a checksum of the data in data field 406 for purposes of detecting communication errors.

ACK Field 410—This field typically is used to acknowledge the integrity of the data and typically comprises 2-bits: an acknowledgement bit and a delimiter bit.

End of Frame Field 412—This field is a 7-bit field that signifies the end of the message.

Interspace Field 414 and Bus Idle Field 416—these fields are used to control the interframe spacing and bus idle time, respectively.

As would be appreciated, the purpose of CRC field 408 is to catch random faults in the communication. Typically, the CRC calculation treats the entire payload (e.g., data field 406) as one big polynomial and calculates the remainder from dividing this payload-polynomial by some quotient polynomial. In CAN buses, generation of the CRC value is performed by the CAN bus controller in hardware, such as by a controller 306 described previously. To do so, the controller uses a simple shift-register (SR) construction.

When the generation of the CRC value starts, the SR is initialized to an initialization vector of all zeros.

Nodes on a CAN bus or other serial network are usually only interested in receiving only certain types of messages. Thus, when a given node with a CAN interface boots, its processor (e.g., processor 308) initiates the controller to alert the processor only when messages bearing specific message identifier are received, filtering out all other messages. In other words, the CAN controller has some small internal data-structure that specifies how the CAN bus is viewed and handled from the perspective of that node.

According to various embodiments, the techniques herein propose that instead of using a simple initialization vector of all zeros for generation of the CRC value, different initialization vectors could be used, depending on the message identifier of the packet to be sent. Each CAN controller will then store this set of initialization vectors for all the message identifies that it can send on the CAN bus. This can be done on a one-to-one basis, where each message ID has a corresponding CRC initialization vector, or on a one-to-many basis, where multiple message IDs are associated with a single CRC initialization vector. For example, to save on space, a node may use a single initialization vector for all of the message identifiers that the node can send.

These initialization vectors used by a sender device to authenticate itself to a receiver can be specified as part of the initialization process for its controller. This initialization process is one of the first steps that a node typically performs and occurs prior to the node making itself available for external communications. Therefore, it can be assumed that, at this point, the node is completely secure and executes trusted code only. This can be achieved, for example, through use of a secure boot mechanism, such as a secure BootROM, secure boot loader or, more generally, a secure chain-of-trust. In addition, in some embodiments, the controller of the node may lock itself and prevent any further modifications until its next system on chip (SoC) reset, once initialized.

To illustrate how the proposed authentication operates, consider again the example 300 shown in FIG. 3. Prior to sending packet 155, processor 308a of node 130a may prepare the payload of packet 155 and send it, typically by writing it to some predefined memory area or register, to controller 306a. In addition, processor 308a may also identify the proper message identifier to use in packet 155 and provide an indication of this identifier to controller 306a.

In response to receiving the message identifier from processor 308a, controller 306a may select an initialization vector that is associated with the message identifier. In turn, controller 306a may generate a CRC value using the selected initialization vector. Controller 306a may then generate packet 155 to include the payload from processor 308a, the message identifier from processor 308a, and the generated CRC value. Controller 306a may then provide packet 155 to transceiver 304b, which sends packet 155 via serial network 115.

In some embodiments, if controller 306a does not have an initialization vector associated with the specified message identifier, controller 306a can either 1.) discard packet 155, effectively preventing node 130a from sending packet 155, or 2.) use a default initialization vector, to calculate the CRC value of packet 155. Such a default vector could be used, for example, to compute CRC values for all outgoing message identifiers whose initialization vectors were not specified. The use of the default initialization vector can then be used by the receiving nodes 130 to identify packet 155 as a rogue packet and will reject it, since its CRC value will be incorrect.

Note that the CRC calculation is a reversible process. That is, the basic operation of the shift register calculating the CRC can be rolled forward to use the initialization vector, to generate the final CRC value (while processing the payload bit-by-bit), and can also be rolled backwards, to convert the CRC value back to an initialization vector (while processing the payload bit-by-bit in reverse order). This means that, given any specific payload of packet 155, there is a 1:1 mapping between initialization vectors and CRC values. This implies that any CRC calculation that uses an incorrect initialization vector will necessarily arrive at an incorrect CRC value.

Given the above, in various embodiments, a receiving node 130 of packet 155 may use the CRC value of packet 155 to validate that packet 155 was indeed sent by node 130a. For example, assume that node 130b receives packet 155 via its transceiver 304a. In turn, controller 306b may extract the message identifier of packet 155 and, based on the message identifier, select its own locally-stored initialization vector that is associated with the message identifier. Using this initialization vector, controller 306b can then generate a CRC value and compare this value to the CRC value of packet 155. If the two CRC values match, controller 306b may still ensure that node 130b is interested in packet 155 and, if so, alert processor 308b that a new message has been received and is ready to be read and processed. Conversely, if controller 306b determines that the two CRC values do not match, or if the message identifier is not of interest to node 130b, controller 306b may discard packet 155.

If controller 306b does not have any initialization vector specified for the message identifier of packet 155, it may use a default vector to compute the CRC values, and use such a default vector for all incoming message identifiers whose initialization vectors were not specified.

Note that if the serial network is well and healthy, CRC errors should not happen. However, CRC errors are still possible if the network is malfunctioning and causing communication errors. For example, communication errors can occur, if the physical cable of the serial network was damaged or a node on the network becomes faulty. When this happens, the fault must be fixed, urgently. Indeed, serial networks, such as a CAN bus, are often used in mission critical applications, so the consequences of continued operation of the system might be severe.

However, overloading the CRC mechanism with the role of sender authentication means that communication errors could be erroneously attributed to malicious attacks. In one embodiment, one way to address this issue is to simply label every CRC error as either a communication problem or an intrusion attempt. Note that, in both cases, the situation needs immediate attention and fixing. Further, at least in some cases, it is easy to differentiate between the two causes of a CRC value mismatch. For example, a faulty cable will cause CRC errors in messages coming from many/all nodes, whereas a malicious attack will manifest itself as CRC errors in messages coming from very few nodes and usually, just one.

Fortunately, there are even better ways to minimize the confusion between an innocent communication error and a malicious attack scenario. Recall that, in practical applications, a natural optimization of the scheme is to use a single initialization vector for all of the message types that a specific node 130 is allowed to send. Theoretically, a CAN bus can support up to thirty-two nodes. However, in practice, this rarely exceeds twenty nodes.

Taking twenty as a practical upper bound, a receiving node 130 can take a packet with an incorrect CRC and check whether its CRC value was generated by one of the initialization vectors of any of the other nodes on the bus. If the answer was no, the controller 306 of the receiving node may determine that the CRC mismatch was caused by a communication error. Conversely, if the answer was yes, the controller 306 may determine that the packet was sent by a malicious node. This testing of all initialization vectors for the various nodes on the network may also be reserved for cases in which the controller 306 determines that there is a CRC mismatch. Of course, there is still a positive probability that a CRC mismatch event will be misclassified, but it is rather small ($20/2^{15} = 5/2^{13} = 0.00061$).

In another embodiment, this testing of different initialization vectors can also be offloaded from a node 130 to an entity outside of serial network 115, such as remote server 140, end device 142, or cloud-based application 144, described previously, so long as the malicious messages are recorded and reported.

As would be appreciated, the sender authentication mechanism introduced herein does not require any modification to the serial network communication protocol in use. In addition, the controllers of most nodes in serial networks already have the logic needed to generate a CRC value. Even the delay caused by first looking up the initialization vector to use for the CRC calculation is very insignificant. The reason for this is that the speed of the CRC calculation is much faster than the communication speed of the serial network, so the CRC will be ready, long before it needs to be sent via the network. The only extra logic required by the controller of a node is searchable storage for the initialization vectors, which is estimated to be twenty or less, in most implementations.

Figure 5:
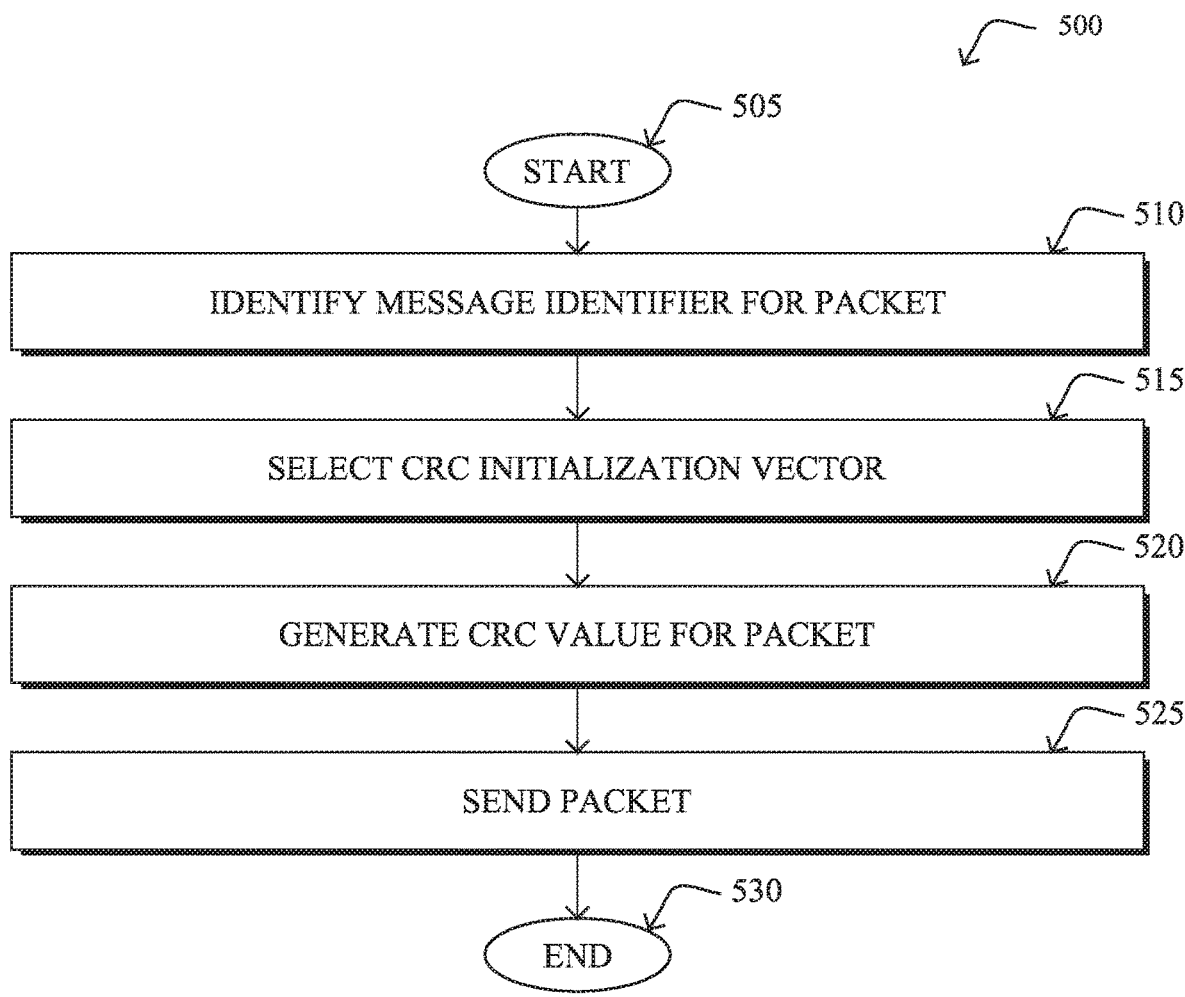
FIG. 5 illustrates an example simplified procedure for sending a packet in a serial network.

FIG. 5 illustrates an example simplified procedure for sending a packet in a serial network, in accordance with one or more embodiments described herein. For example, the processor of a non-generic, specifically configured device (e.g., device 200) may perform procedure 500 by executing stored instructions (e.g., process 248), to act as a sender node in a serial network (e.g., a CAN bus, etc.). The procedure 500 may start at step 505, and continues to step 510, where, as described in greater detail above, the sender node may identify a message identifier for a packet to be sent by the sender node. For example, in the case of a CAN bus, also referred to as CANBUS, the message identifier may be a specific value to be used in the arbitration field of the packet. Such a message identifier can be used by a receiver of the packet to determine whether the receiver is an intended receiver of the packet.

At step 515, as detailed above, the sender node may select a cyclical redundancy check (CRC) initialization vector associated with the message identifier. For example, the sender node may maintain a mapping between CRC initialization vectors and message identifiers. This can be done on a one-to-one basis, where each message ID has a corresponding CRC initialization vector, or on a one-to-many basis, where multiple message IDs are associated with a single CRC initialization vector. In some embodiments, the sender node may even maintain a list of message identifiers that the sender node can use, with the CRC initialization vector being associated with each message identifier in the list. In various embodiments, a controller of the sender node may also verify that a CRC initialization vector is associated with the message identifier of the packet, prior to sending the packet. If the controller does not have a CRC initialization vector associated with the message identifier of the packet, it may either drop the packet or, alternatively, use a default CRC initialization vector.

At step 520, the sender node may generate a CRC value for the packet, based on the selected initialization vector, as described in greater detail above. Typically, this computation is performed in hardware, such as by the CAN controller or other communication controller of the node. Accordingly, the CRC initialization vector may be specified as part of the initialization of the node and may be set to any suitable value.

At step 525, as detailed above, the sender node may send the packet via the serial network. The sent packet includes the message identifier and the generated CRC value. In various embodiments, the receiver node that receives the packet then uses the generated CRC value to authenticate the sender node. Procedure 500 then ends at step 530.

Figure 6:
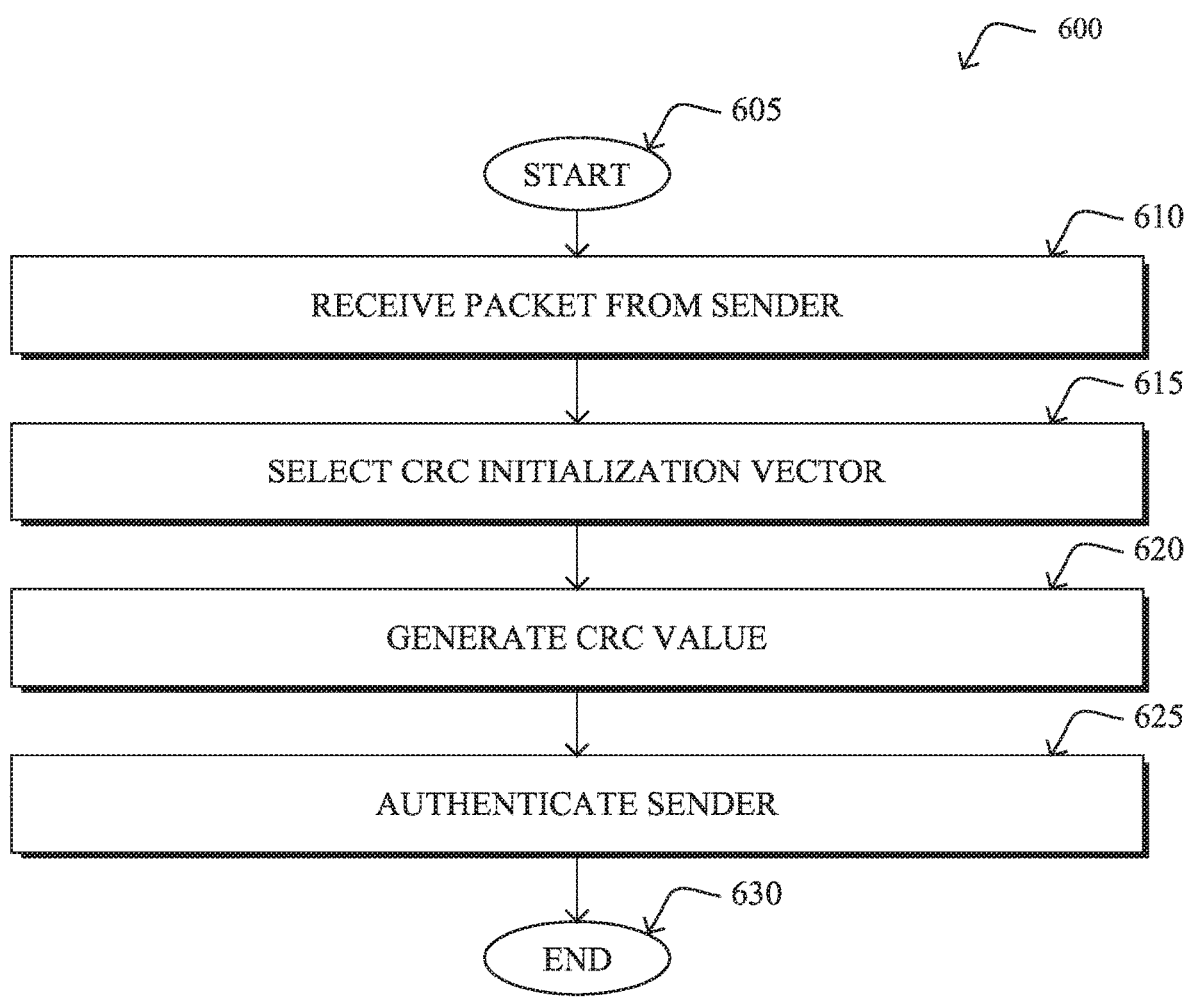
FIG. 6 illustrates an example simplified procedure for authenticating the sender of a packet in a serial network.

FIG. 6 illustrates an example simplified procedure authenticating the sender of a packet in a serial network, in accordance with one or more embodiments described herein. For example, the processor of a non-generic, specifically configured device (e.g., device 200) may perform procedure 600 by executing stored instructions (e.g., process 248), to operate as a receiver node in the serial network. The procedure 600 may start at step 605, and continues to step 610, where, as described in greater detail above, the receiver node may receive a packet from a sender node that includes a message identifier and a cyclical redundancy check (CRC) value. In various embodiments, the sender node may send the packet by identifying a message identifier for the packet, selecting a CRC initialization vector associated with the message identifier, and generating, by the sender node, the CRC value included in the packet, based on the initialization vector selected by the sender node.

At step 615, as detailed above, the receiver node may select a CRC initialization vector associated with the message identifier. Indeed, similar to the sender node described above, the receiver node may maintain a list of message identifiers that are each associated with a CRC initialization vector, either on a one-to-one or one-to-many basis.

At step 620, the receiver node may generate a CRC value, based on the selected initialization vector, as described in greater detail above. This may be done, for example, using the standard CRC generation approach taken in CAN or another serial network, but using a specific initialization vector associated with the message identifier of the packet. In various embodiments, and in contrast to the standard approach to CRC value generation, the initialization vector may be non-zero.

At step 625, as detailed above, the receiver node may authenticate the sender node by comparing the generated CRC value to the CRC value included in the packet. If, for example, the receiver node determines that the generated CRC value and the CRC value included in the packet do not match, it may drop the packet. When this occurs, in some embodiments, the receiver node may also determine whether the generated CRC value and the CRC value included in the packet do not match due to a communication error in the serial network. Indeed, it may be the case that the CRC values do not match simply because of a communication error in the network, rather than the packet having a spoofed message identifier. Procedure 600 then ends at step 630.

It should be noted that while certain steps within procedures 500-600 may be optional as described above, the steps shown in FIGS. 5-6 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow for using the CRC field of a message in a serial network to authenticate the sender node, thereby increasing the security of the network and improving upon the safety of the system. In addition, as the techniques herein leverage the CRC field used by many serial network communication protocols, the format of the packets/messages do not need to be changed, to implement the techniques herein, and do not consume any additional bandwidth.

While there have been shown and described illustrative embodiments that provide for authenticating a sender in a serial network using a CRC value, it is to be understood that various other adaptations and modifications may be made within the spirit and scope of the embodiments herein. For example, while the techniques herein are described primarily with respect to vehicles that include one or more CAN bus sub-systems, the techniques herein can also be adapted for use in other system such as IoT, industrial automation, and the like. In addition, the techniques herein can be adapted for use by any serial network communication protocol that uses CRC fields.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    identifying, by a sender node in a serial network, a message identifier for a packet to be sent by the sender node;
    maintaining, by the sender node, a mapping between a plurality of cyclical redundancy check (CRC) initialization vectors and a plurality of message identifiers;
    selecting, by the sender node and based on the mapping maintained by the sender node, CRC initialization vector among the plurality of CRC initialization vectors, wherein the selected CRC initialization vector is associated with the message identifier;
    generating, by the sender node, a CRC value for the packet, based on the selected initialization vector; and
    sending, by the sender node, the packet via the serial network, wherein the sent packet includes the message identifier and the generated CRC value, and wherein a receiver node that receives the packet uses the generated CRC value to authenticate the sender node.

2. The method as in claim 1, wherein the serial network comprises a Controller Area Network (CAN) bus.

3. The method as in claim 1, further comprising:
    verifying, by a controller of the sender node and prior to sending the packet via the serial network, that a CRC initialization vector is associated with the message identifier of the packet.

4. The method as in claim 3, wherein the controller is configured to drop the packet, prior to sending the packet, if the controller does not have a CRC initialization vector associated with the message identifier of the packet.

5. The method as in claim 3, wherein the controller is configured to select a default CRC initialization vector from which the CRC value is generated, when controller does not have a CRC initialization vector associated with the message identifier of the packet.

6. The method as in claim 1, further comprising:
    maintaining, by the sender node, a list of message identifiers that the sender node can use, wherein the CRC initialization vector is associated with each message identifier in the list.

7. The method as in claim 1, wherein the receiver node that receives the packet uses the generated CRC value to authenticate the sender node by:
    selecting a CRC initialization vector associated with the message identifier;
    generating a CRC value based on the CRC initialization vector selected by the receiver node; and
    authenticating the sender node by comparing the CRC value included in the packet with the CRC value generated by the receiver node.

8. The method as in claim 1, wherein the CRC initialization vector is specified as part of an initialization of the sender node.

9. The method as in claim 1, wherein the serial network is part of a vehicle.

10. A method comprising:
    receiving, at a receiver node in a serial network, a packet from a sender node that includes a message identifier and a cyclical redundancy check (CRC) value;
    maintaining, by the receiver node, a mapping between a plurality of CRC initialization vectors and a plurality of message identifiers;
    selecting, by the receiver node and based on the mapping maintained by the receiver node, a CRC initialization vector among the plurality of CRC initialization vectors, wherein the selected CRC initialization vector is associated with the message identifier;
    generating, by the receiver node, a CRC value based on the selected initialization vector; and
    authenticating, by the receiver node, the sender node by comparing the generated CRC value to the CRC value included in the packet.

11. The method as in claim 10, further comprising:
    determining, by the receiver node, that the generated CRC value and the CRC value included in the packet do not match.

12. The method as in claim 11, further comprising:
    dropping, by the receiver node, the packet, based on the determination.

13. The method as in claim 11, further comprising:
    determining, by the receiver node, whether the generated CRC value and the CRC value included in the packet do not match due to a communication error in the serial network.

14. The method as in claim 10, wherein the serial network comprises a Controller Area Network (CAN) bus.

15. The method as in claim 10, wherein the sender node sends the packet by:
   identifying a message identifier for the packet;
   selecting a CRC initialization vector associated with the message identifier; and
   generating, by the sender node, the CRC value included in the packet, based on the initialization vector selected by the sender node.

16. The method as in claim 10, wherein the serial network is part of a vehicle.

17. An apparatus, comprising:
   one or more network interfaces to communicate with a serial network; a processor coupled to the network interfaces and configured to execute one or more processes; and
   a memory configured to store a process executable by the processor, the process when executed configured to:
      identify a message identifier for a packet to be sent by the apparatus via the serial network;
      maintain a mapping between a plurality of cyclical redundancy check (CRC) initialization vectors and a plurality of message identifiers;
      select, based on the mapping maintained by the apparatus, CRC initialization vector among the plurality of CRC initialization vectors, wherein the selected CRC initialization vector is associated with the message identifier;
      generate a CRC value for the packet, based on the selected initialization vector; and
      send the packet via the serial network, wherein the sent packet includes the message identifier and the generated CRC value, and wherein a receiver node that receives the packet uses the generated CRC value to authenticate the apparatus.

18. The apparatus as in claim 17, wherein the serial network comprises a Controller Area Network (CAN) bus.

19. The apparatus as in claim 17, wherein the receiver node that receives the packet uses the generated CRC value to authenticate the apparatus by:
   selecting a CRC initialization vector associated with the message identifier;
   generating a CRC value based on the CRC initialization vector selected by the receiver node; and
   authenticating the apparatus by comparing the CRC value included in the packet with the CRC value generated by the receiver node.

20. The apparatus as in claim 17, wherein the serial network is part of a vehicle.

* * * * *